United States Patent

[11] 3,581,197

[72] Inventors Dennison H. Morey, Jr.
555 Irwin Lane, Santa Rosa, Calif. 95401;
Melvin Silva, P.O. Box 3276, Hayward,
Calif. 94544; Gordon D. Browning, 19056
Stanton Ave., Castro Valley, Calif. 94546
[21] Appl. No. 863,665
[22] Filed Oct. 3, 1969
[45] Patented May 25, 1971
Continuation-in-part of application Ser. No. 664,112, Aug. 29, 1967, now abandoned.

[54] CAPACITANCE MOISTURE METER AND WING-LIKE PROBE
5 Claims, 9 Drawing Figs.
[52] U.S. Cl. .................................................. 324/61, 331/65
[51] Int. Cl. ............................................... G01r 27/26
[50] Field of Search .......................................... 324/61 R, 61 M; 317/246; 73/304; 331/65

[56] References Cited
UNITED STATES PATENTS
2,720,624 10/1955 Gunst et al. ................. 324/61
2,941,174 6/1960 Richards ..................... 324/61ux
3,146,617 9/1964 Klein et al. .................. 324/61ux
3,344,668 10/1967 Schuck ........................ 73/304

Primary Examiner—Edward E. Kubasiewicz
Attorney—Milmore & Cypher

ABSTRACT: Free moisture in yieldable matter (defined to include water, alcohols, and other liquids of relatively high dielectric constants occurring on the surface of solids or as drops in another liquid) is measured by an instrument which includes a radio frequency oscillator (e.g., 2 MegHz.), preferably voltage-stabilized, connected to an LC circuit that can be made substantially resonant, one of the elements being a capacitance probe, and the potential over one of these elements is measured to indicate the moisture content. The probe preferably includes an outer sheath of metal which partly covers a body of moisture-impermeable dielectric material and leaves a part of the surface of the material exposed, and an inner conductor embedded in the material and thereby completely insulated from the outside of the probe; the capacity between the sheath and conductor varies with the amount of moisture which contacts the exposed surface of the body. When testing material of variable density, such as soil, the probe is placed within the material and the latter is compacted to a predetermined degree if required.

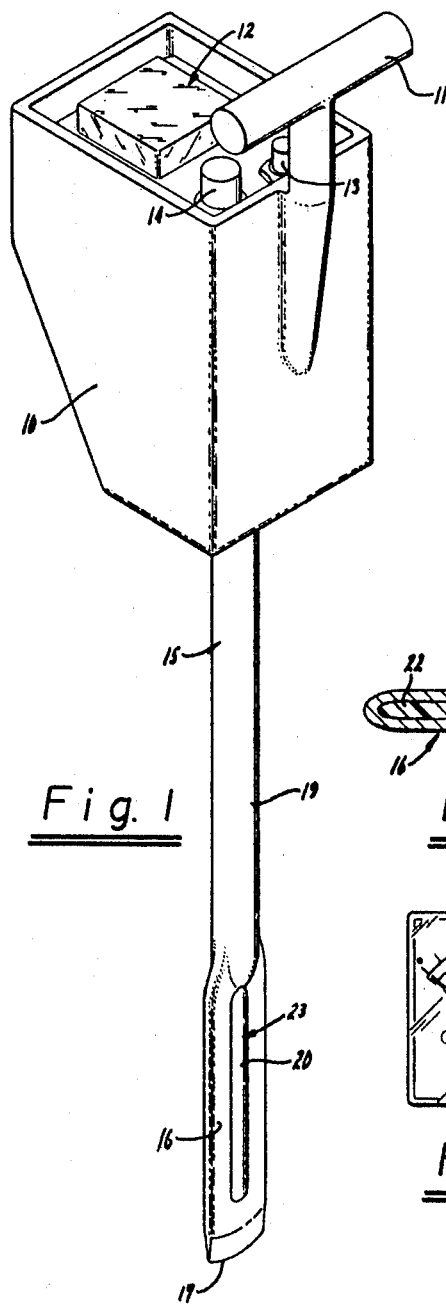
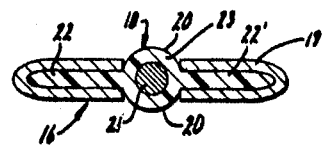
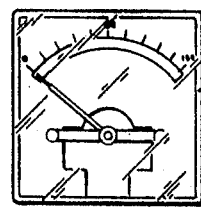
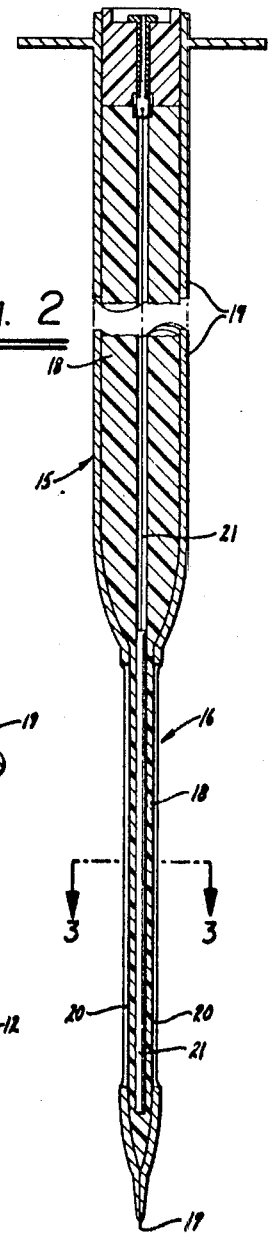

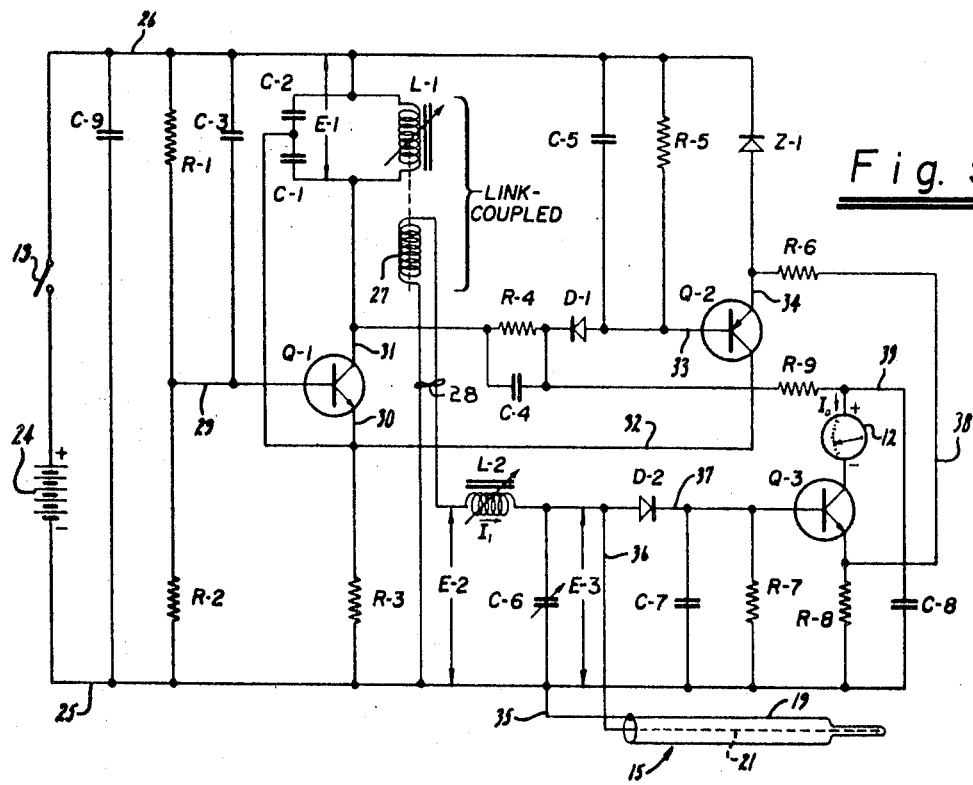
Fig. 5
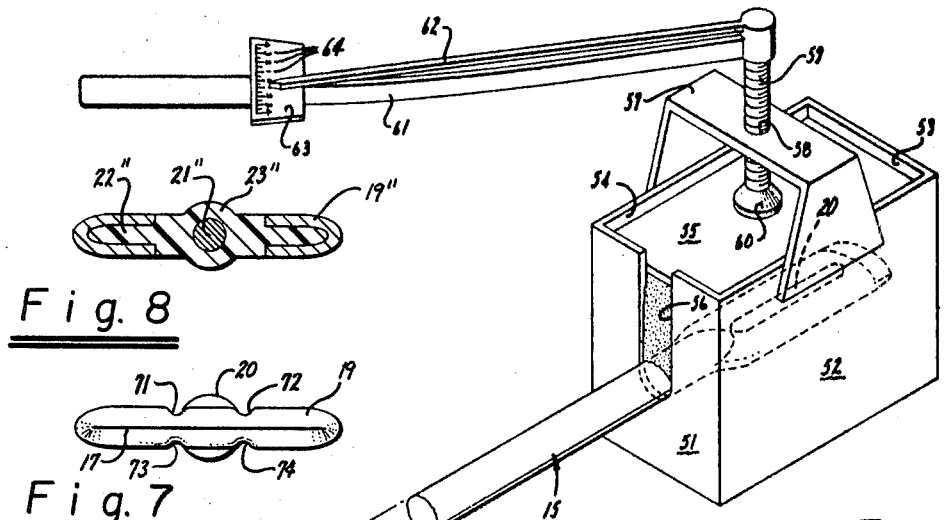
Fig. 6
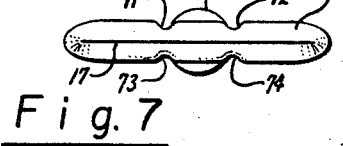
Fig. 8
Fig. 7
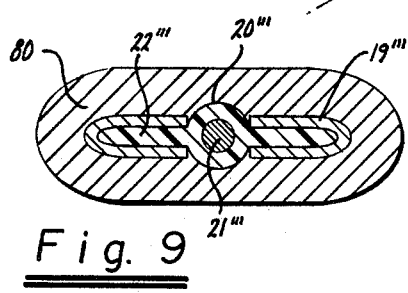
Fig. 9
INVENTORS
Gordon D. Browning
Dennison H. Morey, Jr.
BY Melvin Silva
Attorneys

CAPACITANCE MOISTURE METER AND WING-LIKE PROBE

This application is a continuation in part of our U.S. Pat. application Ser. No. 664,112 filed Aug. 29, 1967 now abandoned.

The invention relates to measuring the moisture content of yieldable matter, such as soil, sand, and liquids when the moisture is free, i.e., occurs as a film or as globules on the surface of solid particles or as liquid which is continuous or dispersed as drops in a liquid immiscible therewith. The term "moisture" is used herein to include not only water but also other liquids which have various dielectric constants, such as alcohols, acetone, glycerol and short chain acetates and ketones and oils.

Prior devices for measuring the free moisture content of yieldable matter have determined the electrical characteristics of such matter, e.g., the resistance or the capacitance of the matter or of a porous mass which was placed into contact with such matter and absorbed or released moisture therefrom. Drawbacks of known techniques have been poor selectivity inter alia, to variable or uncertain contact of the probed electrodes with the yieldable matter, and inaccuracies in the indicated moisture content due to such causes as temperature variations and changes in the electrical characteristics of the yieldable matter or of the porous mass caused by variations in the salt content of the moisture, ionization of the moisture, and the like. A further cause of nonuniform moisture indications has been the variability of the mass of yieldable material which influenced the probe. In particular, in the case of capacitance measurements, the effect is dependent upon the frequency of the electrical signal applied to the probe electrodes which penetrate the matter to an extent influenced by frequency and the size and shape of the dielectric field set up by the probe electrodes.

Another drawback frequently encountered was slowness in response. Especially in probes which include a porous mass interposed between electrodes, whether in electrical contact with the mass (as in resistivity measurements) or insulated therefrom (as in capacitance measurements). Time is required for the porous mass to reach equilibrium with the adjacent matter being tested.

Moreover, the electrical circuit elements used to determine the capacitance of the probe had certain drawbacks. In some devices, the probe was connected to a frequency-changing section of an oscillator, and the resulting frequency of the oscillator was measured to give an indication of the capacitance of the probe. While the improved probe of this invention and the method of using it can be employed with such known circuits, stability and accuracy are often difficult to attain, and the calibration of such circuits by an operator without technical proficiency is often difficult.

Finally, inaccuracies often occurred when yieldable matter of variable density was tested (as distinguished from liquids or highly compacted soil, etc.). Such matter may contain air to an extent that depends upon the degree of compaction, and the measured moisture content is greatly influenced by the air. Of course, this problem is important only when the true moisture content of soil or the like is of interest, and not when, as in agriculture, one is interested in the degree of moisture content of the soil in whatever state of compaction it is in.

Now according to the present invention, there is provided an improved capacitance probe in which the conductor elements which constitute the probe capacitor are insulated from each other by a body of moisture impervious dielectric material within which one of the conductors is embedded so as to avoid all contact with the matter being tested, and the other conductor is situated externally of the dielectric body and has one or more windows that leave a part of the external surface of the body exposed. A change in the capacity of the probe is effected by placing the exposed surface and the latter conductor adjacently to the yieldable matter being tested or to a body of liquid used for calibration; the said change is caused by the contact of moisture from such matter with the exposed surface to an extent that varies with the free moisture content of the matter and is greatest when the matter is a continuous body of liquid. It was found that the selectivity to a given fluid of such a probe and its speed of response are markedly greater than prior probes. Further, it was found that the accuracy of the moisture measurement is only slightly affected by the quantity of salts or ionization level occuring in the moisture or matter under test, since the probe along with its method of metering and calibration substantially overcomes such errors. Accuracy of water in soil measurements of better than 1 percent have been obtained.

Further, the invention provides an improved measuring circuit which is preferably used in conjunction with the improved probe (but is not so limited in application). This circuit includes a radiofrequency oscillator of constant frequency and output voltage, the output circuit of which is connected to an inductance and the probe, which are connected in series and have characteristics to form a circuit which is nearly series-resonant for at least one condition of the probe. A trimming or calibrating condenser can be included, e.g., in shunt with the probe, for calibrating the instrument by bringing about a condition close to series resonance. The potential across one of the series-connected circuit elements, preferably the probe, is measured by any suitable device, such as an electronic circuit having a high input impedance and which can generate an output current, potential, or frequency indicative of the moisture content as determined by the probe capacitance. In a specific embodiment the measuring device includes an ammeter the dial of which is calibrated in terms of moisture content that is under test.

The measuring circuit can be powered as desired. In a preferred embodiment the moisture meter is portable and contained within a small box and is powered by a battery of dry or mercury cells. In this embodiment the circuit is advantageously provided with a voltage-regulating stage to effect oscillations of constant frequency and constant voltage despite changes in the battery voltage. To achieve or improve linearity in the output, the measuring circuit preferably provides negative feedback to further control the oscillator's output amplitude and, therefore, the metering circuit overall stability.

When the instrument is used to determine the absolute free moisture content of matter of variable density, such matter, e.g., soil, is placed into a compaction device which also contains the active part of the probe, and the matter is compacted by applying a predetermined amount of pressure.

The invention will be further described with reference to the accompanying drawings, which show one preferred embodiment of the probe and measuring circuit and the use of the compaction device, wherein:

FIG. 1 is an isometric view of the meter and probe;

FIG. 2 is a longitudinal section of the probe, taken on a central, vertical

FIG. 3 is a transverse section through the active part of the probe, taken on the line 3-3 of FIG. 2 but to an enlarged scale and showing the full cross section;

FIG. 4 is a plan of the indicating instrument;

FIG. 5 is a schematic circuit diagram of the meter; and

FIG. 6 is an isometric of a compaction device;

FIG. 7 is an end view of an alternative form of the probe;

FIG. 8 is a cross section of still another form of probe taken along a line corresponding to the section line 3-3 in FIG. 2;

FIG. 9 is a cross section of still another form of the device as it would appear when taken along a corresponding line to that of line 3-3 shown in FIG. 2.

Referring to FIG. 1, the meter includes a box 10 having rigidly fixed to its rear a handle 11 and carrying an instrument panel on which are mounted a moisture indicating meter 12, an ON-OFF switch 13, and the adjusting knob 14 of a variable calibrating capacitor. Rigidly, but detachably connected to the front of the box by a friction coaxial connector which provides a pair of electrical connections, is a probe 15. It should be kept in mind as an alternate way, the probe can also be connected via a flexible coaxial cable and plug. Referring further to FIGS. 2 and 3, the probe is elongated and may be cylindrical throughout most of its length to the rear, and is flattened at its active part near the front as appears at 16. It provides a thin, e.g., sharp edge 17 at the end to facilitate insertion into soil, sand, or other yieldable matter. The probe includes a body 18 of dielectric material which is nonpermeable to moisture, such as polyethylene, polypropylene, Teflon. This material is preferably hydrophobic when water moisture or water miscible moisture is measured, or oleophobic when water-immiscible moisture is measured. Permeable and glossy materials should be avoided. A first electrical conductor 19 is formed as a sheath and encases the body 18 contiguously, but surround that body only partly at the active portion 16, i.e., it has windows so as to leave one or more external surfaces 20 of the body 18 exposed and preferably flush with the outer surfaces of conductor 19. The body further contains embedded therein a second electrical conductor 21 which extends from the rear to just short of the edge 17; the conductor 21 may be enlarged adjacently to the active portion 16. The conductor 21 is completely insulated from the conductor 19 and, at least at portions of the probe which are to make contact with the matter being tested, is isolated from all contact with such matter. The conductors 19 and 21 form the plates of the probe capacitor. Advantageously, the conductor 19 is made of corrosion resistant metal, such as brass or stainless steel. These conductors are shaped at the rear end of the probe to make electrical contacts with connectors on the box 10.

In the preferred construction, the flattened part 16 is shaped to provide a pair of wings 22, 22', integral with and extending on opposite sides of the central, partly cylindrical portion 23 of the body, and the wings are substantially encased by the sheath-shaped conductor 9. The exposed surfaces 20 of the dielectric body 18 are situated on the convex, central part 23, between the wings, and these surfaces are preferably elongated throughout substantially the full length of the active part 16 as appears in FIGS. 1 and 2. For example, the length of the windows in the conductor 19 are from 4 to 15 times their widths. The surfaces 20 are preferably smooth, although they may be fluted. Typically, the exposed surfaces 20 are preferably smooth, although they may be fluted. Typically, the exposed surfaces 20 may be from one-eighth to one-half inch in width and from 1 to 6 inches in length.

Referring to FIG. 5, the circuit is, for portability, advantageously battery powered, as by a 9 volt battery 24 connected between a common ground circuit 25 and the switch 13. This switch may be spring biased, normally open, and is closed by depressing its button only during the time for calibration adjustment or making a moisture reading. The controlled circuit 26 is connected to an oscillator of any desired type which is tuned to operate at a constant frequency in the radiofrequency range. A frequency of 2 MegHz. was found to be eminently suitable, but other frequencies can be used, preferably below 10 MegHz. and above 100 kHz. depending upon the size and sensitivity of the probe and probe material used.

In the illustrative embodiment, a Colpitts oscillator is shown, which is tuned by a tank circuit including a capacitor C-1 in series with C-2, and an inductance L-1, the latter being link-coupled to a coil 27. The terminals of this coil are connected to a pair of twisted wires 28 which constitute a low impedance output circuit from the oscillator and one side of which is connected to the ground or common circuit 25 and the other to the series-resonant circuit to be described. A capacitor C-9 is preferably connected across the power supply to bypass RF. Resistors R-1 and R-2 form a voltage divider and their junction is connected by a circuit 29 to the base of a NPN transistor Q-1. The emitter is connected by a circuit 30 via a resistor R-3 to the ground circuit 25, and the collector by a circuit 31 via the tank circuit C-1, C-2, L-1 to the circuit 26. Positive feedback is established by the connection of the emitter circuit 30 to the junction of C-1 and C-2.

A regulator stage is provided to insure proper operation despite variations in the voltage of the battery, which may differ by several volts from the nominal 9 volts. This stage includes PNP transitor Q-2 having its collector connected by circuits 30 and 32 to the emitter of the transistor Q-1 and its base connected by a circuit 33 as follows: A resistor R-4 and a diode D-1 are connected to the circuit diode as follows: A resistor R-4 and a diode D-1 are connected to the circuit 31, the resistor being shunted by a capacitor C-4 which bypasses radio frequency signals; and a resistor R-5 shunted by a capacitor C-5, is connected to the circuit 26. The emitter is connected by a circuit 34 as follows: A Zener diode Z-1 (which may be replaced by forward conducting diodes having its anode connected toward circuit 26) is connected to the circuit 26; and a resistor R-6 is connected to the emitter of a transistor Q-3 to be described.

The diode Z-1 in the emitter circuit of Q-2 provides a constant reference voltage in relation to that of the circuit 26, and this is compared to the voltages E-1; developed in the tank circuit. Since the capacitor C-4 bypasses R-4 at RF frequencies, E-1 is effectively present at the detector diode D-1, providing bias to the Q-2 base. R-5 acts as a load resistor to D-1 as well as a base return resistance for Q-2 and C-5 filters RF. If the generated voltage E-1 (and, hence, the voltage E-2 in the output circuit 28) should fall due to battery or circuit or oscillator amplitude changes, this will cause Q-2 to draw less current and therefore the emitter-to-collector voltage of Q-1 will increase, causing a greater RF voltage in the tank circuit. The converse occurs upon a rise in the voltage E-1. Thereby the circuit including Q-2 constitutes a constant-voltage servosystem wherein Q-2 regulates the output of Q-1. It is evident that the essential feature of this regulator involves the connection between the transistors Q-1 and Q-2 and NPN device, requiring an an interchange of the terminals and polarity. Similarly, other minor circuit modifications are necessary when an oscillator other than a Colpitts circuit is used.

The RF voltage E-2 is applied to a nearly series-resonant circuit including an inductance L-2 and the probe 15 capacitance where probe 15 is electrically in parallel with calibrating capacitor C-6 as well as circuit or distributed capacitance. Probe 15 outer conductor is connected to common circuit 25 by circuit 35 and its inner conductor by circuit 36 to the junction of L-2, C-6 and anode of diode D-2. By means of the calibration capacitor C-6 (tuned by knob 14) the maximum required capacitance can be set for a given probe moisture condition after initially setting the inductor L-2 for the required inductance to overall capacitance ratio, thereby adjusting the scaling or sensitivity of the device. The potential across one of the series—connected elements (meaning the inductor L-2 or the combined probe 15 capacitance) is measured; preferably, the voltage across the probe 15. This measuring circuit includes a detector diode D-2 having its anode connected to the junction of the probe and L-2, and further connected by a circuit 37 to the base of an NPN transistor Q-3, which circuit is further connected to the ground circuit 25 through a resistor R-7, shunted by RF filter capacitor C-7. The emitter, which is connected to the resistor R-6 via a circuit 38, is further connected to the circuit 25 via a biasing resistor R-8. The collector of Q-3 is connected serially to an indicator, such as the meter 12, which may be a milliammeter, and to the cathode of the diode D-1 via a current limiting or collector load resistor R-9 and a circuit 39. Capacitor C-8 bypasses RF from the positive side of meter 12 to common circuit 25.

NPN transistor Q-3, as shown, is basically used as a current amplifier. When there is little or no RF potential across the probe 15 (E-3) Q-3 is cut off. The conducting point of Q-3 is determined by its emitter back-biasing potential developed across R-8, principally produced by the current through R-6 which is tied to the more positive potential point at circuit 34. The same current through R-6 which is tied to the more positive potential at circuit 34. The same current through R-6 also maintains minimum required bias current through Zener diode Z-1 described above. When the RF level E-3 across probe 15 is sufficiently high, diode D-2 will rectify on the positive RF peak and bias the base of Q-3 toward conduction, when the resulting DC voltage across resistor R-7 is sufficient. The output or collector current $I_o$ then, measured by meter 12, varies in direct proportion to the probe 15 RF level E-3.

The meter 12 may be calibrated directly in terms of moisture, in any desired units. For example, when intended as a meter for measuring free moisture in soil, it is convenient to adopt a scale from 0 to 100, indicating percentage of moisture, as appears in FIG. 4. It should be understood, however, than an indicating meter is not essential; thus, in industrial and other control applications the output at the collector of the transistor Q-3 can be used to control a function directly such as the solenoid valve on an automatic sprinkler system. Also, the scaling on the meter need not be linear with moisture.

In the circuit shown, it is preferred to adjust the circuit elements associated with the probe to a near resonance frequency condition, where at resonance, at the oscillator's frequency, the resultant reactance of the inductor L-2 equals the reactance of the resulting probe 15 and combined circuit capacitance including C-6. Specifically, the preferred circuit shown is a series resonant type but, as well understood by knowledgeable students, a parallel resonant circuit coupled to the oscillator stage can also be made to operate in similar manner. For the example here, the capacity of the circuit is less than the amount at resonance, therefore the circuit is tuned above resonance when the probe 15 is under dry or minimum capacitance conditions. When the capacitance is brought closer to resonance, the circulating current $I_1$ will increase faster than the reactance decreases (as the case is when moisture surrounds the probe 15) therefore, the measured voltage across the probe increases. If a plot is made of the voltage across a series resonant circuit, the capacitance voltage (E-3) versus the capacitance changes, under above resonant conditions, the resultant current would be found quite linear, typical for values of capacitance change representing approximately 20 percent of the value of capacitance required at resonance and applies to just the steep portion of its curve. As well known, the steepness of the resonant curve is a function of $Q_o$ defined as the resonant circuit quality factor and is determined by the ratio of either reactance to the resultant series losses or resistance. When the $Q_o$, is deliberately made low, the effects of changes in loss, e.g. conductivity, resistance or ionization, of the moist medium under test has lesser effects on the above capacitance voltage curve. As covered earlier, it and not the conductive, lossy, effects. Further advantages for the application of this type of circuit are its sensitivity to changes in capacitance and requires very low power and/or low gain in its associated detector circuit. Resultingly, the associated circuitry is kept simple, easy to adjust and calibrate as well as inexpensive. The maximum span of capacitance change resulting from probe 15 is usually quite small typically 5 to 10 picofarads for practically all moisture tests encountered. At the frequency chosen, it is easy to so adjust the elements of the resonant circuit for a near linear response for such changes as discussed above and the usual required length of the probe 15 is of small concern.

In order to obtain greater linearity when voltage versus probe capacitance change and therefore meter 12 $I_o$ readings, it is highly desirable to provide some additional compensation. As noted, negative feedback is provided where $I_o$ provides a voltage drop across R-4. The voltage drop across R-4 effectively adds to the oscillator's peak RF E-1 and causes regulator stage Q-2 to conduct more therefore decreasing E-1 and therefore E-2 as $I_o$ is increased. For any value $I_o$ the regulator stage still functions as described above except it keeps the oscillator output E-1 regulated at a lower value than when $I_o$ is zero. This negative feedback helps stabilize the equivalent gain of the tuned probe circuit, for each value of probe capacitance, and the overall gain of detector D-2 amplifier circuit Q-3 as referred to its input driving source which E-2 is a resultant.

The theory of operation and performance of the probe can be best explained as follows: The capacitance of a given dielectric media is dependent on the size and shape of the two oppositely charged conductors as well as the resulting susceptibility of the dielectric material that is between the effective areas of the two conductors. The effective dielectric material that increases the susceptibility is that which is penetrated by the electric field set up by the two insulated conductors. By confining the lines of the electrostatic field to the close boundaries of the outer dielectric surface (18 in FIG. 3) of the probe 15, the change in susceptibility will be effected by a thin section of material that is intimate with the dielectric area the maximum field is concentrated towards the window edges.) Liquids are the most mobile material that will penetrate the boundary effecting a pronounced change in the susceptibility and therefore the capacitance.

By confining the field in the manner described above, greatest sensitivity occurs close to the dielectric boundaries and field penetration into the moist matter is avoided. The extent of field penetration can be controlled to a large extend by the actual width of the window, the frequency of the measuring or powering device, and the extent of outward protrusion of the dielectric for a given dielectric material 18 used. As mentioned earlier, the advantage of this field application is to look strictly at the change in moisture and not the ionization of the surrounding matter where the effects of ionization and therefore the susceptibility are variable for any given moisture content. With the physical probe illustrated, ionization penetration is kept at a a minimum and that which is apparent, using the described measuring device produces negligible effects on the response.

Furthermore, the displacement of the electrostatic field set up of the preferred probe is greater across the (constant) dielectric material used than across the more "lossy" dielectric material. The physical configuration of the preferred probe can be said to be coaxial where the capacitance change per unit length can be linear. The length of the window determines only the length of material sampled by the probe. The scaling of the meter is so adjusted for this opening.

Because the body 18 is repellent to the moisture, the moisture on the exposed surfaces rapidly decreases when the probe is removed from the environment of the matter being tested; this results in a rapid response. The probe is adequately cleaned by wiping with a cloth.

As was previously indicated, the instrument is not limited to determining the water content of matter, but it can detect other liquids having dielectric constants that are high in relation to that of the dielectric body 18. Thus, various organic liquids having dielectric constants above 10 can be detected, the instrument being, of course, suitably calibrated for this purpose. When water-immiscible liquids are to be tested, the exposed surfaces 20 should repel such liquids. The resin Teflon is eminently suited to various liquids. The present device is useful also in determining the moisture content of loose material which has been compacted as for example in earth fills for building foundations, roads and the like. Referring to FIG. 6, the moisture meter is then used in combination with a device having a bottom wall 50, sidewalls 51, 52, 53 and 54 forming a top opening for receiving a quantity of loose material. A top plate 55 which is substantially coextensive with the top opening is placed in the enclosure and moves along the sidewalls while disposed parallel to the bottom wall. One of the sidewalls is formed with a vertically extending slot 56 dimensioned for receiving the probe of a moisture reading meter. Means are provided, preferably on the device to move the top plate toward the bottom wall and maintain it in a predetermined position with a predetermined force to hold the material in compression. Preferably the device is constructed with U-shaped member 57 bridging two of the sides and is formed with a threaded opening 58 for receiving a member 59 such as a threaded screw formed with a member 60 for engaging the top plate. One method of applying a predetermined force to the top plate is to mount a torque bar handle 61 to the screw having an indicating pointer 62 and a scale plate 63 formed with indicia marks such as 64.

In use, a quantity of compacted soil in which the moisture is to be measured is placed in the container. Usually it is preferable to only partially fill the container so that the probe of a moisture indicating meter may be more easily inserted through the slot opening in the side. After calibrating the meter and inserting the probe into the container, additional material is placed on the container to cover the probe. The top plate is then placed on the loose material and the handle is turned until the torque handle indicates the predetermined force reading. The meter of the moisture indicating device is then turned on by the switch 13 and the meter 12 is compared with the readings of a conversion table which is based on the type of soil to be tested.

The calibration of the probe and the described measuring circuit can be effected quite easily. The first consideration is given to the dielectric constants of the liquid and the medium to be measured. The probe, when placed with its sensing area fully covered in a liquid is so scaled to give a reading directly proportional to the dielectric constant of the liquid. With a linear scale on meter 12 of 0 to 100, a reading of approximately 95 is obtained for 500 p.p.m. NaCl water solution, 80 for de-ionized water, 60 for methyl alcohol and approximately 10 for acetone. The scaling below 10 is usually not considered since most dry media encountered have a dielectric constant at 10 or less. As can be seen, the meter can be calibrated to read the required setting in each fluid and therefore its calibration is referred to a given standard fluid. In practice, the sensitivity of the probe and meter is adjusted by adjusting L-2 and C-6 such that first a reading of 80 is obtained in de-ionized water, than a check for reading of 60 in methyl alcohol. If methyl alcohol was to be the highest reading dielectric, then it should be so adjusted to read higher on the meter scaled i.e. the meter scale is then expanded or the probe is sensitivity increased.

As another example, in regard to calibration to read 100 percent in water when the probe is fully immersed a relative linear change can be noted on the meter as the displacement of the probe in the water is changed while slowly removing the probe from the water. Also, close to a 50 percent reading is obtained when just one side or the other of the probe sensing area is covered by the water. As can be seen, the probe and its meter can be operated as a fluid level gauge. It is important to note, however, that the sensitivity and uniformity of the probe can easily be checked. Since the actual number of liquid molecules that cover the sensing area of the probe can determine the true proportional moisture content in the soil or other media, the above calibration methods become an important advantage for consistent readings.

When making moisture measurements in damp soil, the probe is first immersed in water that has been ionized to the minimum extent used in the soil; usually tap or irrigation water use is completely sufficient and the set knob 14 is adjusted for a meter reading of 95 while depressing switch 13. The probe is then inserted into the ground and a reading can be taken. For most practical purposes the reading in direct linear scaling of the meter will give a reading close to the percent of free water in the soil where its maximum at 95 represents the maximum water holding capacity of the soil. Many clay soils, as an example, will give a higher reading than 95 when over saturated or muddy. A correction curve or table giving the more accurate percentage for the given soil type based on weighed and dry sampling can be used or the actual scale provided on the meter.

The linearity of the detector or measuring means with capacitance and using the type or probe disclosed herein is not of great importance for the actual performance. It is extremely helpful, however, in easily calibrating the probe for various moisture contents or levels and can therefore aid in relieving error. The above described circuit can be used on a variety of size and shaped probes generally measuring the change in capacity with moisture. Similarly, the probe can also be used with other types of capacitance measuring circuits including bridges and operate for a variety of measurements.

FIG. 7 shows an end view of an alternative form of the probe which has been found to improve the accuracy of the readings. In this form, the lower end of the probe is extruded so as to form grooves 71, 72, 73, and 74. The grooves form longitudinal channels from the sharp edge of the probes to the flattened part to provide a gradual transition to the lower end of the exposed dielectric where it joins the first electrical conductor. This effectively prevents the formation of a void, particularly in hardened cohesive soils, so that the soil does not come in intimate contact with the dielectric at the intersection of the dielectric and the first electrical conductor along the portion shown in FIG. 3.

FIG. 8 shows another alternative form of the probe wherein the dielectric 23'' is shaped to form a close fit with the edges of the first conductor 19''. The probe in this form is relatively free of the problem of voids forming in the soil to prevent intimate contact with the first conductor at the portion where the dielectric comes in contact with the soil.

Still another alternative form of the device is shown in FIG. 9 in which the probe, such as the one shown in either FIGS. 3, 7 or 8 is encased in a sheath or gypsum 80 or other material having a standard and uniform porosity. Since this form of the probe is generally buried in the soil for periods of upwards of several hours, the controls are preferably mounted at a location remote from the probe. The advantage of this form of the probe is to insure more uniform readings and to avoid the necessity of calibrating the instrument in terms of the particular soil type and its soil tension. Thus the measurement of water to nonwater is practically independent of the soil type. It is to be noted that the sensitivity of the instrument is increased by reducing the thickness of the dielectric covering the second electrical conductor.

We claim:

1. An elongated capacitance probe for measuring free moisture in yieldable matter which comprises:
    a. a body of dielectric material which is nonpermeable to moisture;
    b. a first electrical conductor forming one element of a capacitor for making contact with said yieldable matter and covering a part of said body and leaving an external surface of said dielectric material exposed for engagement with the yieldable matter at a sensing portion;
    c. said dielectric material having a cross section at said sensing portion which is exposed and which consists of a central portion with a pair of wings extending outwardly therefrom;
    d. said first electrical conductor substantially covering said wings of said dielectric;
    e. a second electrical conductor forming a second element of said capacitor situated within said dielectric body completely insulated from said first conductor and being located within the central portion of said dielectric at said sensing portion, and;
    f. said dielectric material completely filling the space between said conductors permitting moisture to contact only the exposed surface of said dielectric along said central portion at said sensing portion.

2. A capacitance probe as defined in claim 1 wherein said exposed surface of said dielectric is smooth, convex, and has a length greater than its width and said first electrical conductor having a sharpened spade end for insertion into said yieldable matter and being formed with elongated grooves from the sharp end to said sensing portion.

3. A device as described in claim 1 in a capacitance moisture meter which comprises:
    a. a radiofrequency oscillator having an output circuit;
    b. an inductance connected in series with said capacitance probe across said output circuit; and
    c. a measuring circuit connected to measure the potential across said inductance of paragraph b.

4. A capacitance moisture meter as defined in claim 3 wherein:

a. said measuring circuit includes an indicator calibrated in terms of moisture content of said yieldable matter.

5. A capacitance moisture meter as defined in claim 3 wherein:

a. said measuring circuit is connected to measure the potential across said probe.